United States Patent [19]

Black

[11] 4,111,897

[45] Sep. 5, 1978

[54] EPDM COMPOSITION

[75] Inventor: Arthur Leroy Black, Richfield, Ohio

[73] Assignee: The B. F. Goodrich Company, Akron, Ohio

[21] Appl. No.: 846,864

[22] Filed: Oct. 31, 1977

[51] Int. Cl.$^2$ ............................ C08K 3/04; C08K 5/37
[52] U.S. Cl. ............................... 260/42.33; 260/42.31; 260/42.47; 526/3; 526/20; 526/30
[58] Field of Search ............... 260/42.31, 42.33, 42.47; 526/3, 20, 30

[56] References Cited

U.S. PATENT DOCUMENTS

| | | | |
|---|---|---|---|
| 2,791,572 | 5/1957 | Doak | 260/42.31 |
| 2,891,926 | 6/1959 | Doak | 260/42.31 |
| 3,378,510 | 4/1968 | Wheat | 260/42.33 |
| 3,554,960 | 1/1971 | Cluff | 260/42.33 |

*Primary Examiner*—James H. Derrington
*Attorney, Agent, or Firm*—Joe A. Powell; J. Hughes Powell, Jr.

[57] ABSTRACT

Small quantities of pentachlorothiophenol and/or the metal salt thereof of pentachlorothiophenol inhibits premature vulcanization in an EPDM composition containing carbon black.

16 Claims, No Drawings

EPDM COMPOSITION

BACKGROUND OF THE INVENTION

When the various compounding ingredients are mixed with a polymer to form a rubber compound, it is necessary that the mixed compound be capable of withstanding a limited amount of exposure to heat before vulcanization initiates. This limited exposure to heat is necessary in order to further process the compound by extruding, calendering, and the like, and also to obtain proper mold flow. The compound must flow in order to conform to the shape of the mold before vulcanizing. Rubber compounds are typically formulated to withstand about 5 to 15 minutes exposure at 280° F. before the onset of vulcanization. This time span is commonly referred to as the scorch time of the compound. The onset of vulcanization, which is commonly referred to as scorch, is noted by an increase in the viscosity of the compound. If a scorched compound is further processed, it becomes lumpy and for most applications is unusable.

In a typical styrene-butadiene or natural rubber formulation, the compound will not scorch until after the vulcanization agents are added to the formulation. Therefore, the normal mixing procedure is to add the vulcanization agents near the end of the mixing cycle. If additional time to scorch is desired, post vulcanization inhibitors which function by delaying the action of the vulcanization agents may be used.

The ethylene-higher α-olefin-polyene (EPDM) polymers have enjoyed wide use in recent years. These polymers have excellent weather resistant properties which leads to their acceptability in applications requiring ozone and heat resistance. The EPDM polymers also have the capability to accept large amounts of fillers such as carbon black, clay, oil and the like. Since increased loading with fillers tends to reduce the cost of a rubber compound, the EPDM polymers are frequently mixed with large amounts of fillers.

In a rubber formulation, carbon black is normally mixed with the polymer at the beginning of the mixing cycle in order to obtain good dispersion of the large amounts of carbon black normally used in the polymer. When EPDM polymers are mixed with substantial amounts of carbon black, premature vulcanization or scorch occurs during further processing and compounding. This scorch occurs even in the absence of vulcanization agents. Since typical commercial vulcanization inhibitors function by delaying the action of the vulcanization agents, they are ineffective in preventing scorch in an EPDM-carbon black mixture where no vulcanizing agents are present. It is desirable to have an EPDM-carbon black mixture which will not scorch.

SUMMARY OF THE INVENTION

Compositions comprising EPDM and carbon black do not exhibit premature vulcanization or scorch by the addition of at least 0.1 and preferably at least 0.5 part by weight of pentachlorothiophenol and/or the metal salt thereof of pentachlorothiophenol. With the use of pentachlorothiophenol, large amounts of carbon black may be mixed with EPDM polymers without experiencing premature vulcanization during further processing.

DETAILED DESCRIPTION

The ethylene-higher α-olefin-polyene (EPDM) polymers employed have an ethylene content of from about 10% to about 90% by weight, a higher α-olefin content of about 10% to about 80% by weight, and a polyene content of about 0.5% to about 20% by weight, all weights based on the total weight of the polymer. The higher α-olefin contains 3 to about 14 carbon atoms. Examples of these are propylene, isobutylene, 1-butene, 1-pentene, 1-octene, 2-ethyl-1-hexene, 1-dodecene, and the like. The polyene can be a conjugated diene such as isoprene, butadiene, chloroprene, and the like; a nonconjugated diene; a triene, or a higher enumerated polyene. Examples of trienes are 1,4,9-decatriene, 5,8-dimethyl-1,4,9-decatriene, 4,9-dimethyl-1,4,9-decatriene, and the like. The nonconjugated dienes are more preferred. The nonconjugated dienes contain from 5 to about 25 carbon atoms. Examples are nonconjugated diolefins such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclo nondienes such as 3-methyl-bicyclo (4,2,1) nona-3,7-diene, 3-ethylbicyclonondiene, and the like; indenes such as methyl tetrahydroindene and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadieneyl)-2-norbornene, and the like; and tricyclo dienes such as 3-methyl-tricyclo-$(5,2,1,0^{2,6})$-3,8-decadiene and the like.

Preferably, the EPDM polymers contain from about 20% to about 80% by weight of ethylene, about 19% to about 70% by weight of a higher α-olefin, and about 1% to about 10% by weight of a nonconjugated diene. The more preferred higher α-olefins are propylene and 1-butene. The more preferred polyenes are ethylidene norbornene, 1,4-hexadiene, and dicyclopentadiene.

More preferably, the EPDM polymers have an ethylene content of from about 50% to about 70% by weight, a propylene content of from about 20% to about 49% by weight, and a nonconjugated diene content from about 1% to about 10% by weight, all weights based upon the total weight of the polymer.

The EPDM polymers, also known as elastomeric copolymers of ethylene, a higher-α-olefin and a polyene, have molecular weights from about 20,000 to about 2,000,000 or more. Their physical form varies from waxy mateials to rubbers to hard plastic-like polymers. They have dilute solution viscosities (DSV) from about 0.5 to about 10, measured at 30° C. on a solution of 0.1 gram of polymer in 100 cc. of toluene.

While this invention has particular utility in preventing scorch in EPDM-carbon black mixes, it may also be applied to blends of EPDM and other sulfur vulcanizable elastomers when the polymer blend contains carbon black. Other sulfur vulcanizable elastomers that may be blended with EPDM include the highly unsaturated diene rubbers having an olefinic content from about 20% to about 45% by weight based upon the otal weight of the polymer. The rubbers usually contain at least 50% and up to 100% by weight of a conjugated diene monomer containing 4 to about 8 carbon atoms, and up to about 50% by weight of copolymerizable vinylidene monomers having a terminal vinylidene ($CH_2 = C<$) group. Examples of the conjugated diene monomers are butadiene, isoprene, chloroprene, 2-isopropyl-1, 3-butadiene, 1,3-pentadiene, and the like. More preferred are the conjugated dienes containing 4 to about 6 carbon atoms such as butadiene chloroprene, and isoprene. Low unsaturated elastomers may also be blended with the EPDM for use in this invention. Examples of low unsaturated elastomers include polymers of isobutylene-isoprene commonly referred to as butyl rubbers, and halogenated butyl rubbers such as chlorobutyl and bromobutyl.

Examples of copolymerizable vinylidene monomers containing a terminal vinylidene group are (a) monoolefins containing 2 to about 8 carbon atoms; (b) vinyl aromatics such as styrene α-methyl styrene, vinyl toluene, chlorostyrene, and the like; (c) vinyl nitriles such as acrylonitrile, methacrylonitrile, and the like; (d) vinyl and allyl esters such as vinyl acetate, vinyl propionate, allyl acetate, and the like; (e) vinyl and allyl ethers such as vinyl methyl ether, allyl methyl ether, and the like; (f) divinyls and diacrylates such as divinylbenzene, divinyl ether, diethylene glycol diacrylate, and the like; and (g) acrylates of the formula

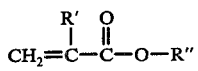

wherein R' is —H, —CH$_3$, or —C$_2$H$_5$, and R" is an alkyl radical containing 1 to 18 carbon atoms or an alkoxyalkyl, an alkylthioalkyl, or cyanoalkyl radical containing 2 to about 12 carbon atoms. Examples of such acrylates are ethyl acrylate, butyl acrylate, octadecyl acrylate, methoxyethyl acrylate, butoxyethylacrylate, hexylthioethyl acrylate, α-cyanoethyl acrylate, cyanooctyl acrylate, methyl methacrylate, octyl methacrylate, ethyl ethacrylate, and the like.

The EPDM polymers are present in the composition of this invention at a level of from about 25 parts by weight to 100 parts by weight per 100 parts by weight of sulfur vulcanizable rubber. Preferably the EPDM polymers are present at a level of from about 50 to about 100 parts by weight per 100 parts by weight of sulfur vulcanizable rubber. More preferred the EPDM polymer(s) constitute the entire 100 parts by weight of the sulfur vulcanizable rubber. The EPDM portion of the composition may be one EPDM polymer or a blend of two or more EPDM polymers.

In addition to the EPDM polymer(s) the composition may contain up to 75 parts by weight of at least one other sulfur vulcanizable rubber including for example the general purpose rubbers and specialty rubbers. Examples of sulfur vulcanizable rubbers which may be present in the composition are: polyisoprenes, (styrene-butadiene) copolymers, polybutadienes, polychloroprenes, (butadiene-acrylonitrile) copolymers, polypentenamer rubbers, butyl rubbers, halogenated butyl rubbers and the like. Blends of two or more of the above polymers may be used.

The compositions of this invention must contain at least 25 and preferably at least 50 parts by weight of carbon black per 100 parts by weight of rubber. More preferred, the carbon black is present at a level of from about 100 parts by weight to about 300 parts by weight per 100 parts by weight of rubber.

Any of the carbon blacks normally used in rubber will cause scorch when mixed with EPDM polymers. Examples of such carbon blacks are those with ASTM designation N110. N219, N234, N303, N330, N339, N347, N351, N550, N660, N765, N774, N785, N990 and the like. The level and type of carbon black used will depend on the desired properties of the composition. Normally from about 25 to about 300 parts by weight per 100 parts by weight of polymer are used. Amounts greater than 300 parts by weight may be used in certain applications. For applications requiring high loading levels, the larger particle size carbon blacks such as N660, N990 and the like are preferred.

Pentachlorothiophenol and/or the metal salts of pentachlorothiophenol such as the zinc salt are used at a level of at least 0.1 part by weight per 100 parts by weight of sulfur vulcanizable rubber. Preferably the level of pentachlorothiophenol and/or the zinc salt of pentachlorothiophenol is used at a level of from about 0.5 part by weight to about 1.5 parts by weight per 100 parts by weight of sulfur vulcanizable rubber. Levels greater than 1.5 parts by weight may be used although amounts greater than 1.5 parts by weight are not normally necessary to prevent premature vulcanization in EPDM compositions. Pentachlorothiophenol is preferred over the metal salts of pentachlorothiophenol for use in this invention.

Pentachlorothiophenol and the zinc salt of pentachlorothiophenol are known as peptizers for natural rubber. They aid in the oxidative chain scission of the natural rubber molecule, thereby making the rubber softer in the unvulcanized state. Such materials are not used in EPDM compounding. It was quite surprising to find that these materials functioned as scorch inhibitors for EPDM/carbon black mixtures. Pentachlorothiophenol is sold by DuPont under the trade name RPA #6. RPA #6 is 80% pentachlorothiophenol and 20% oil. The purpose of the inert oil is to act as a dust depressant. The zinc salt of pentachlorothiophenol is sold by DuPont under the trade name Endor which is 20% zinc salt of pentachlorothiophenol and 80% inert filler. Because of its lower amount of active ingredient, a larger amount of Endor must be used to inhibit premature vulcanization as compared to RPA #6.

Quite surprisingly, another well known natural rubber peptizer, 2-naphthalenethiol, is not effective in prevently premature vulcanization in EPDM compositions containing carbon black.

In addition to the polymers, carbon black, pentachlorothiophenol and/or the zinc salt of pentachlorothiophenol, the compositions of this invention may contain other compounding ingredients which are normally used in rubber compounds. Examples of these ingredients are fillers such as zinc oxide, clay, titanium dioxide and the like; curing agents, plasticizers and the like. Age resistors such as antiozonants, antioxidants and the like are normally used when EPDM is blended with other diene rubbers such as natural rubber or styrene-butadiene rubber. When EPDM is the only polymer present, age resistors are normally not used because EPDM polymers have excellent age resistance properties. The polymers used in this invention may be oil-extended polymers, that is the oil may be combined with the polymer at the point of polymer manufacture.

The compositions of this invention may be mixed on conventional rubber mixing equipment such as mills, Banbury mixers, continuous mixers and the like. The mixing procedure followed is that normally used in rubber mixing except that the pentachlorothiophenol is added at the beginning of the mix along with the polymer. After the polymer and pentachlorothiophenol are added to the mixer, the carbon black is added. Other ingredients such as fillers, oil, curing agents and the like may be mixed with the composition in the normal manner well known to those skilled in the art. They may be further processed into final products by extruding, calendering and molding as a typical rubber compound.

The compositions of this invention may be evaluated for premature vulcanization or scorch by using the Mooney Scorch Test described in ASTM D 1646. This test consists of a motor driven disk device for measuring the effect of temperature and time on the viscosity of elastomeric materials. When the rubber sample is first placed in the machine, the rubber becomes less viscous and reaches a minimum viscosity (Mv) and then the viscosity begins to rise. The time required for the viscosity to rise 5 units above minimum ($t_5$) is defined as the scorch time. The time required for the viscosity to rise 35 units above the minimum ($t_{35}$) is defined as the cure time. During the test the temperature remains at a contant 280° F. If after 30 minutes a compound's viscosity has not reached a value of 5 units above the minimum viscosity, then the test is terminated and a viscosity reading is taken.

The following examples are presented to more fully illustrate the present invention.

EXAMPLE 1

This example is presented to show that a styrenebutadiene (SBR) composition will not scorch when only carbon black is present but an EPDM composition will scorch when only carbon black is present. Scorch is also noted when carbon black is mixed into a blend of SBR and EPDM. Pentachlorothiophenol is shown to be effective in preventing scorch in EPDM and EPDM/SBR blends containing carbon blacks. The recipes together with the scorch test results are shown in Table I. The sample recipes were prepared by mixing on a mill with the mill rolls at about 230° F. The polymer was first banded on the mill rolls then the carbon black was added and worked into the polymer. When pentachlorothiophenol was used it was added to the mix immediately before the carbon black. The Mooney Scorch test was run according to ASTM D 1646.

TABLE I

| INGREDIENTS | SAMPLE | | | | | |
|---|---|---|---|---|---|---|
| (Parts by Weight) | A | B | C | D | E | F |
| SBR[1] | 100 | 50 | 25 | — | 50 | 25 |
| EPDM[2] | — | 50 | 75 | 100 | 50 | 75 |
| N660 Carbon Black | 90 | 90 | 90 | 90 | 90 | 90 |
| 80% Pentachlorothiophenol[3] | — | — | — | — | 1 | 1 |
| Mooney Scorch at 280° F, Small Rotor | | | | | | |
| Minimum Viscosity | 65 | 82 | 84 | 73 | 60 | 65 |
| $t_5$-minutes | — | 22.0 | 3.7 | 8.2 | — | — |
| $t_{35}$-minutes | — | — | 6.1 | 9.5 | — | — |
| Viscosity after 30 minutes | 65 | 109 | — | — | 60 | 65 |

[1]Type 1502 SBR
[2]Epcar 587, Mooney viscosity 8' at 212° F = 50; 70 wt% ethylene
[3]#6 – 80%pentachlorothiophenol, 20% oil The above results show that when SBR is mixed with carbon black (Sample A) there is no increase in viscosity of the mixture after 30 minutes, therefore indicating no tendency to scorch. Samples B, C, and D show that when blends of SBR and EPDM or EPDM alone are mixed with carbon black, then scorch occurs. The recipes of Samples E and F are identical with B and C respectively except that in Samples E and F one part by weight of 80% active pentachlorothiophenol was present per 100 parts by weight of polymer. In Samples E and F there was no increase in viscosity after 30 minutes, indicating that the pentachlorothiophenol was effective in retarding premature vulcanization or scorch.

EXAMPLE 2

This example is presented to show that scorch time decreases as the amount of carbon black increases in an EPDM composition. Pentachlorothiophenol is also shown to effectively prevent scorch at various loadings of carbon black. The recipes together with the scorch test results are shown in Table II. The sample recipes were prepared as in Example 1.

TABLE II

| INGREDIENT | SAMPLE | | | | | | | |
|---|---|---|---|---|---|---|---|---|
| (Parts by Weight) | G | H | I | J | K | L | M | N |
| Oil extended EPDM[4] | 200 | 200 | 200 | 200 | 200 | 200 | 200 | 200 |
| N660 Carbon Black | 100 | 125 | 150 | 175 | 100 | 125 | 150 | 175 |
| 80% Pentachlorothiophenol | — | — | — | — | 0.75 | 0.75 | 0.75 | 0.75 |
| Mooney Scorch at 280° F, Small Rotor | | | | | | | | |
| Minimum Viscosity | 38 | 43 | 55 | 72 | 37 | 49 | 55 | 69 |
| $t_5$-minutes | 16.5 | 13.5 | 9.5 | 5.0 | — | — | — | — |
| $t_{35}$-minutes | 22.0 | 17.0 | 11.2 | 6.5 | — | — | — | — |
| Viscosity after 30 minutes | — | — | — | — | 37 | 49 | 55 | 69 |

[4]Epcar 5875, 100 parts by weight of oil and 100 parts by weight EPDM

The above results show that as the the amount of carbon black in the recipe increases the compositions become more scorchy (lower $t_5$). The results also show that in samples K, L, M, and N which have the same recipes as Samples G, H, I, and J respectively, except that in Samples K, L, M, and N there is 0.75 part by weight of 80% active pentachlorothiophenol present, that the pentachlorothiophenol was effective in preventing scorch.

EXAMPLE 3

This example is presented to show that 2-naphthalenethiol, a well known peptizer is not effective in preventing premature vulcanization in an EPDM composition containing carbon black. The recipes together with the scorch tests are shown in Table III. The sample recipes were prepared as in Examples 1 and 2.

TABLE III

| | SAMPLE | |
|---|---|---|
| Ingredient (Parts by Weight) | O | P |
| Oil-extended EPDM[5] | 200 | 200 |
| N660 Carbon Black | 180 | 180 |
| 33% 2-naphthalenethiol[6] | 3 | 1 |
| Mooney Scorch 280° F, Small Rotor | | |
| $t_5$-minutes | 5.3 | 6.0 |
| $t_{35}$-minutes | 7.5 | 7.3 |

[5]Epcar 5875, 100 parts by weight oil and 100 parts by weight EPDM
[6]RPA #2 sold by DuPont, 67% paraffin wax, 33% 2-naphthalenethiol The above results show that 2-naphthalenethiol does not inhibit scorch in an EPDM compound containing carbon black.

EXAMPLE 4

This example is presented to show that the zinc salt of pentachlorothiophenol is effective in preventing premature vulcanization in an EPDM composition containing carbon black. A recipe was prepared containing the carbon black and EPDM as in Example 3 except 4 parts by weight of 20% active zinc salt of pentachlorothiophenol (Endor sold by DuPont) was added to the recipe. The ingredients were mixed and tested for scorch as in Examples 1, 2 and 3. After 30 minutes at 280° F., the viscosity of the compound was the same as the minimum viscosity, thus indicating that the zinc salt of pentachlorothiophenol was effective in preventing premature vulcanization.

The above four examples show that both pentachlorothiophenol and the zinc salt of pentachlorothiophenol are effective in preventing premature vulcanization of an EPDM composition containing carbon black. This is quite unexpected in view of the results that shown that 2-naphthalenethiol, a known peptizer is not effective in preventing scorch.

The compositions of this invention have many uses. Pentachlorothiophenol and/or the zinc salt of pentachlorothiophenol prevents premature vulcanization thus allowing the compositions to be further processed by extrusion, calendering and molded. Many products such as belts, hose, tires and mats may be produced from the compositions of this invention.

I claim:

1. A composition comprising (a) an elastomeric copolymer of ethylene, a higher α-olefin, and a polyene, (b) at least 25 parts by weight of carbon black, and (c) at least 0.1 part by weight of at least one compound selected from the group consisting of pentachlorothiophenol and the metal salts of pentachlorothiophenol wherein (b) and (c) are each based on 100 parts by weight of said copolymer.

2. A composition of claim 1 wherein the copolymer contains 10 percent to about 90 percent by weight of ethylene, about 10 percent to about 80 percent by weight of a higher α-olefin containing 3 to about 14 carbon atoms, and from about 0.5 percent to about 20 percent by weight of a nonconjugated diene containing 5 to about 25 carbon atoms, all weights based upon the weight of the polymer.

3. A composition of claim 2 wherein the copolymer contains a nonconjugated diene content of from about 1 percent to about 10 percent by weight of the polymer, and the ethylene content is from about 20 percent to about 80 percent by weight and the higher α-olefin content is from about 19 percent to about 70 percent by weight.

4. A composition of claim 3 wherein the level of pentachlorothiophenol and the salt thereof is from about 0.5 parts by weight to about 1.5 parts by weight per 100 parts by weight of copolymer.

5. A composition of claim 4 wherein pentachlorothiophenol is present at a level of from about 0.5 parts by weight to about 1.5 parts by weight per 100 parts by weight of copolymer.

6. A composition of claim 5 wherein carbon black is present at a level of at least 50 parts by weight per 100 parts by weight of copolymer.

7. A composition of claim 6 wherein carbon black is present at a level of from about 100 parts by weight to about 300 parts by weight per 100 parts by weight of copolymer.

8. A composition of claim 7 wherein the higher α-olefin is selected from the group consisting of propylene and 1-butene, and the nonconjugated diene is selected from the group consisting of ethylidene norbornene, 1,4-hexadiene and dicyclopentadiene.

9. A composition of claim 8 wherein the higher α-olefin is propylene and the nonconjugated diene is ethylidene norbornene.

10. A cured composition of claim 1.

11. A method of inhibiting premature vulcanization in a composition comprising an elastomeric copolymer of ethylene, a higher α-olefin, and a polyene, and at least 25 parts by weight of carbon black per 100 parts by weight of said copolymer; wherein said method comprises mixing with said composition at least 0.1 part by weight per 100 parts by weight of said copolymer of at least one compound selected from the group consisting of pentachlorothiophenol and the metal salts of pentachlorothiophenol.

12. A method of claim 11 wherein said compound selected from the group consisting of pentachlorothiophenol and the metal salts of pentachlorothiophenol is mixed with the copolymer portion of the composition prior to mixing said carbon black with the copolymer.

13. A method of claim 12 wherein the copolymer contains 10 percent to about 90 percent by weight of ethylene, about 10 percent to about 80 percent by weight of a higher α-olefin containing 3 to about 14 carbon atoms, and from about 0.5 percent to about 20 percent by weight of a nonjugated diene containing 5 to about 25 carbon atoms, all weights based upon the weight of the polymer.

14. A method of claim 13 wherein the copolymer contains a nonconjugated diene content of from about 1 percent to about 10 percent by weight of the polymer, and the ethylene content is from about 20 percent to about 80 percent by weight and the higher α-olefin content is from about 19 percent to about 70 percent by weight.

15. The method of claim 14 wherein the higher α-olefin is selected from the group consisting of propylene and 1-butene, and the nonconjugated diene is selected from the group consisting of ethylidene norbornene, 1,4-hexadiene and dicylclopentadiene.

16. A method of claim 15 wherein the higher α-olefin is propylene and the nonconjugated diene is ethylidene norbornene.

* * * * *